F. H. MORT.
Closing Drum Containing Caustic Soda.

No. 230,646. Patented Aug. 3, 1880.

Attest:
D. Butler
Wm. Perkins

INVENTOR:
Frederick Harry Mort
By P. C. Dyrenforth,
Attorney

United States Patent Office.

FREDERICK H. MORT, OF WIDNES, ENGLAND.

CLOSING DRUMS CONTAINING CAUSTIC SODA.

SPECIFICATION forming part of Letters Patent No. 230,646, dated August 3, 1880.

Application filed January 20, 1880. Patented in England December 10, 1878.

*To all whom it may concern:*

Be it known that I, FREDERICK HARRY MORT, of Widnes, in the county of Lancaster, England, have invented certain new and useful Improvements in Closing or Covering Drums or Casks for Containing Caustic Soda and other Like Substances, for which English Letters Patent have been granted to me dated December 10, 1878, and numbered 5,052; and I hereby declare the following to be a full, clear, and exact description thereof, reference being had to the accompanying drawings, of which—

Figure 1:
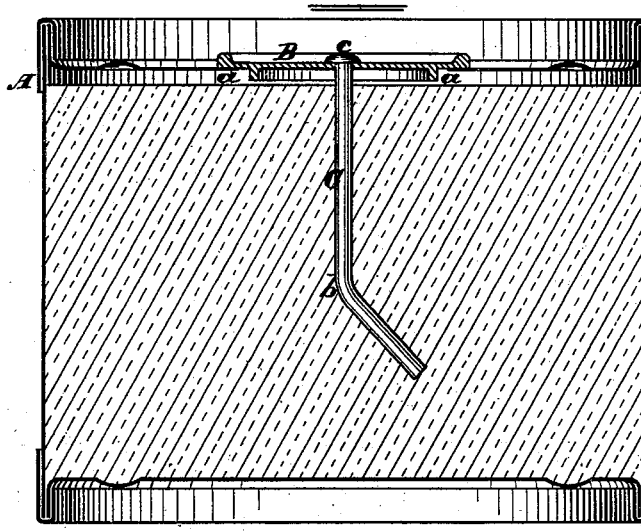
Figure 3:
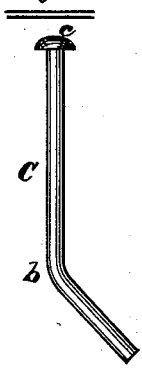
Figure 2:
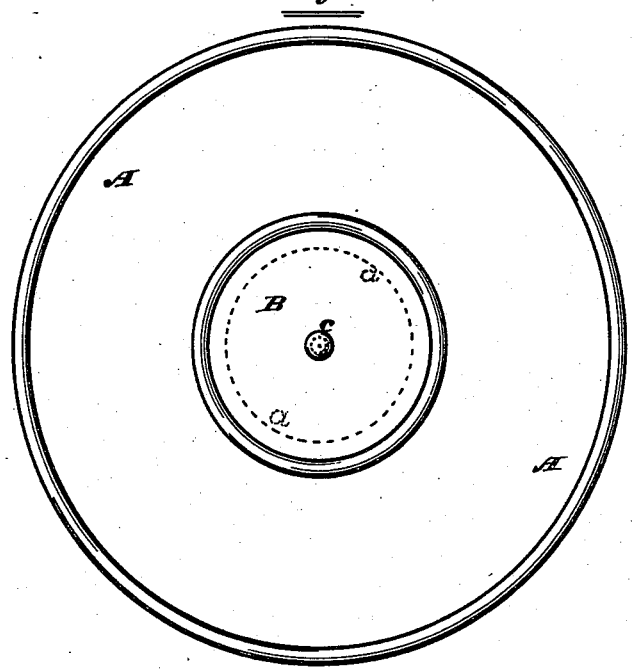

Figure 1 represents a vertical section of a drum or cask for containing caustic soda with the lid or cover secured thereon by means of my invention; Fig. 2, a plan view of the same; Fig. 3, an elevation of the pendent projection detached; and Fig. 4 a view similar to Fig. 3, but illustrating a slight modification.

My said invention has for its object providing a cheap, ready, and efficient means of effecting a tight closure of the metallic drums or casks employed for containing caustic soda and other like substances.

According to the ordinary method, bolts and nuts and other devices requiring manipulation are employed, and these devices, apart from the trouble and inconvenience which attend their use, entail additional expense.

My invention consists in forming on or attaching or fitting to the lid or cover a pendent projection or projections, which, when the drum or cask is filled with caustic soda, (for example,) and the lid or cover is applied, extend down to any required depth into the liquid, in such manner that the caustic soda, as it solidifies by cooling, will be caused to tightly fit and grasp the projection or projections, and thus firmly secure the lid or cover to the drum or cask.

The accompanying drawings illustrate a mode of carrying out my said invention.

A, Figs. 1 and 2, is the drum or cask, having in the top thereof an opening, *a*, which is closed by a lid, B, of suitable size to cover the opening. This lid is fitted with a pendent projection, C, (shown detached in Fig. 3,) which, assuming the drum or cask to have been filled with caustic soda, extends down to a sufficient depth into the liquid in such manner that the caustic soda, as it solidifies by cooling, will be caused to tightly fit and grasp the projection C, and thus firmly secure the lid B to the drum or cask A.

The pendent projection C, in the example illustrated, is bent at *b*, so as to increase the hold or adhesion thereon or thereto of the solidified material contained in the drum or cask; but it may be notched, barbed, or otherwise shaped or provided with appendages for a like purpose. The mode of connecting the pendent projection with the lid may, likewise, be varied.

The projection C (shown detached in Fig. 3) is simply provided with a head, *c*, which serves to hold the projection suspended from the lid.

Figure 4:
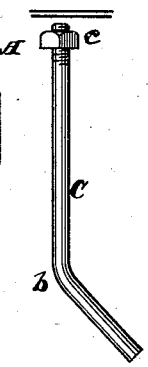

In the case of drums or casks for sampling purposes it may be found more convenient to make the head *c* in the form of a nut, as shown in Fig. 4, the upper end of the projection being screw-threaded for its reception, as by this means increased facility is afforded for opening the drum or cask in order to obtain samples of its contents.

When the drum or cask has been opened and it is required to temporarily reclose it, any suitable device may be used for the purpose.

Two or more pendent projections may be employed for each lid, either constructed and connected to the lid in a similar manner to the single pendent projection, or in any other suitable manner.

The brand or mark of the manufacturer of the contents of the drum or cask may be stamped upon the pendent projection or projections, which remain intact until the drum or cask is delivered to the consumer, even although the lid or cover should become detached and lost. The brand or mark is thus rendered capable of identification even in the case of accident to the lid or cover.

What I claim as new, and desire to secure by Letters Patent, is—

A device for closing or covering drums or casks for containing caustic soda and other like substances, consisting of a lid or cover for the drum or cask provided with one or more internal projections, whereby the contents of the drum or cask, as they solidify by cooling, are caused to tightly fit and grasp the projection or projections, and thus firmly secure the lid or cover to the drum or cask, substantially as described.

FREDERICK HARRY MORT.

In presence of—
FRANCIS CHIDDELL,
2 *Cressington Park, Aigbath, Liverpool,*
HENRY B. SHORES,
*Pineapple Terrace, Appleton-on-Widnes.*